United States Patent
Ernt et al.

(10) Patent No.: US 9,994,962 B2
(45) Date of Patent: Jun. 12, 2018

(54) SOLVENT EXTRACTION AND STRIPPING SYSTEM

(71) Applicant: MINEXTECH LLC, Oro Valley, AZ (US)

(72) Inventors: William Daniel Ernt, Mesa, AZ (US); George M. Galik, Diamond Bar, CA (US)

(73) Assignee: MINEXTECH, LLC, Oro Valley, AZ (US)

( * ) Notice: Subject to any disclaimer, the term of this patent is extended or adjusted under 35 U.S.C. 154(b) by 0 days. days.

(21) Appl. No.: 15/051,352

(22) Filed: Feb. 23, 2016

(65) Prior Publication Data
US 2017/0241028 A1 Aug. 24, 2017

(51) Int. Cl.
*C25C 1/12* (2006.01)
*C22B 3/26* (2006.01)
(Continued)

(52) U.S. Cl.
CPC ............ *C25C 1/12* (2013.01); *B01D 11/0476* (2013.01); *B01F 3/0861* (2013.01); *B01F 5/061* (2013.01);
(Continued)

(58) Field of Classification Search
CPC ... C25C 1/12; C22B 15/0071; C22B 15/0086; C22B 3/08; C22B 3/22; C22B 3/16; B01F 2215/0075; B01F 5/061; B01F 3/0861; B01F 3/0865; B01F 5/0601; B01F 5/0659; B01F 5/0682; B01F 5/0695; B01D 11/0476; B01D 11/04; B01D 11/0446–11/0473
See application file for complete search history.

(56) References Cited

U.S. PATENT DOCUMENTS

| | | | |
|---|---|---|---|
| 3,705,061 A | 12/1972 | King | 156/19 |
| 4,269,676 A | 5/1981 | Libus et al. | 204/107 |
| 4,272,492 A | 6/1981 | Jensen | 423/24 |
| 4,475,821 A | 10/1984 | Koch et al. | 366/160 |
| 4,595,571 A | 6/1986 | Galik | 422/259 |
| 4,657,401 A | 4/1987 | Galik | 366/263 |
| 4,683,310 A | 7/1987 | Dalton et al. | 546/321 |
| 4,874,534 A | 10/1989 | Sorensen et al. | 210/803 |
| 5,176,802 A | 1/1993 | Duyvesteyn et al. | 204/106 |
| 5,196,095 A | 3/1993 | Sudderth et al. | 204/106 |
| 5,466,375 A | 11/1995 | Galik | 210/634 |

(Continued)

FOREIGN PATENT DOCUMENTS

| | | | | |
|---|---|---|---|---|
| CH | 615360 A5 | * | 1/1980 | B01F 3/04517 |
| GB | 405349 A | * | 2/1934 | B01D 11/0449 |

OTHER PUBLICATIONS

Mueller CH 615360 Machine translation.*
International Search Report and Written Opinion issued in application PCT/US17/19157, dated May 10, 2017 (9 pgs).

*Primary Examiner* — David C Mellon
*Assistant Examiner* — Liam Royce
(74) *Attorney, Agent, or Firm* — Hayes Soloway PC

(57) ABSTRACT

An apparatus for separating a mixture of two liquids of different densities which liquids are substantially insoluble in one another includes a hollow permeable body having a recess for receiving a first fluid which can flow from the recess through the permeable body to an exterior of the permeable body. A housing surrounds and is spaced from the exterior of the permeable body. The housing has an inlet for a second fluid and an outlet for a mixture of the first and second fluid. A baffle or baffles are provided in the space between the exterior of the permeable body and the housing, and to define a mixing channel in space between the exterior of the permeable body and the housing so that the second fluid can enter the housing inlet and flow through the mixing channel to the outlet, while picking up fluid on the exterior of the permeable body.

18 Claims, 4 Drawing Sheets

(51) Int. Cl.
  *C22B 3/16* (2006.01)
  *C22B 15/00* (2006.01)
  *B01F 3/08* (2006.01)
  *C22B 3/22* (2006.01)
  *B01F 5/06* (2006.01)
  *B01D 11/04* (2006.01)
  *C22B 3/08* (2006.01)

(52) U.S. Cl.
  CPC .............. *C22B 3/0005* (2013.01); *C22B 3/08* (2013.01); *C22B 3/16* (2013.01); *C22B 3/22* (2013.01); *C22B 15/0071* (2013.01); *C22B 15/0086* (2013.01); *B01F 2215/0075* (2013.01); *Y02P 10/234* (2015.11); *Y02P 10/236* (2015.11)

(56) References Cited

U.S. PATENT DOCUMENTS

| | | | | |
|---|---|---|---|---|
| 5,632,962 A | * | 5/1997 | Baker ...................... | B01D 3/32 |
| | | | | 261/79.2 |
| 5,849,172 A | | 12/1998 | Allen et al. .................. | 205/581 |
| 6,440,054 B1 | | 8/2002 | Galik ............................. | 494/22 |
| 2003/0029795 A1 | | 2/2003 | Galik ............................. | 210/634 |
| 2014/0313849 A1 | * | 10/2014 | Hata .................... | B01F 3/0807 |
| | | | | 366/181.6 |
| 2016/0289091 A1 | * | 10/2016 | Strimple ................. | C02F 1/008 |

\* cited by examiner

SOLVENT EXTRACTION AND STRIPPING SYSTEM

FIELD OF THE INVENTION

The present invention relates solvent extraction and stripping systems, i.e. methods and apparatus. The invention has particular utility in connection with the processing of solutions containing metals, such as, for example, the production of copper by solvent extraction of copper containing solutions followed by electrowinning of a rich copper electrolyte obtained by stripping copper from a copper containing solvent, and will be described in connection with such utility, although other utilities are contemplated.

DESCRIPTION OF RELATED ART

In many industries it often is useful to disperse a first fluid of one type in a second fluid of a different type. For example, carbon dioxide gas is dispersed (dissolved) in water to form carbonated water. In another example, liquid-liquid extraction (where two mutually insoluble liquids contact each other) is used to produce pharmaceuticals and other chemicals, treat water, process food, and recover metals from ore. For example, the mining industry has used liquid-liquid ion exchange for many years to recover metal from aqueous leaching solutions, such as described in U.S. Pat. No. 5,196,095 to Sudderth et al, and U.S. Pat. No. 4,683,310 to Dalton et al. Liquid-liquid ion exchange has also been used for years to recover dissolved copper from etching solutions, such as described in U.S. Pat. No. 3,705,061 to King, in accordance with a recovery process such as that disclosed in U.S. Pat. No. 5,466,375 to Galik. Each of the four patents mentioned above are incorporated herein by reference.

The four classes of extractants typically employed in the industry are:
1. Chelation Extractants
2. Ion Pair Extractants
3. Neutral or Solvating Extractants
4. Organic Acid Extractants These extractants are compared in Tables 1 to 4 below:

TABLE 1

Chelation Extractants

EXTRACTANT CLASS

CHELATING AGENTS
FORMULA OR STRUCTURE

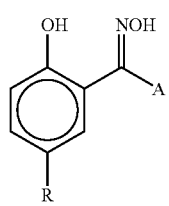

R = $C_9H_{19}$ or $C_{12}H_{25}$
Ketoximes A = $CH_3$
Salicylaldoximes A = H

EXTRACTION CHEMISTRY $2RH_{(org)} + MSO_4 \rightleftharpoons R_2M_{(org)} + H_2SO_4$
or
$2RH_{(org)} + M(NH_3)_4^{+2} \rightleftharpoons R_2M_{(org)} + 2NH_3 + 2NH_4^+$ TABLE 1-continued Chelation Extractants

MODIFIERS

ALCOHOLS, PHENOLS, ESTERS (TXIB)
KETOXIMES/ALDOXIME MIXTURES
SPECIAL FEATURES

Main commercial extractants for copper
Operate on hydrogen ion cycle. Stripping is reverse of extraction
Function with acid and ammoniacal leach solutions
More selective than other extractant classes
Kinetically slower than ion pair extractants
Have good physical properties in terms of phase separation, low aqueous solubility, chemical stability
Relatively expensive to manufacture

TABLE 2

ION-PAIR EXTRACTANTS

| EXTRACTANT CLASS | ION-PAIR EXTRACTANTS FORMULA OR STRUCTURE |
|---|---|
| Quaternary Amines | $R_3R'N^+Cl^-$ |
| Primary Amines | $RNH_2$ |
| Secondary Amines | $R_2NH$ |
| Tertiary Amines | $R_3N$ |
| Trialkyl Guanidines | |

EXTRACTION CHEMISTRY -
QUARTERNARY AND TERTIARY AMINES

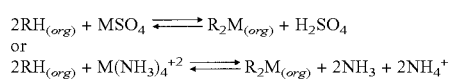

$R_3N_{(org)} + H^+ \rightleftharpoons R_3NH^+_{(org)}$ Protonation
$R_3NH^+ \rightleftharpoons R_3NH^+M^-_{(org)} + H^+$

MODIFIERS  ISODECANOL OR TRIDECANOL, AROMATIC DILUENT
SPECIAL FEATURES

Commercial extractants for uranium, thorium, vanadium, gold, cobalt and other metals
Modifiers promote solubility of the extractant - metal complex in the diluent
Kinetics, both extraction and stripping are fast
Extraction is usually of a metal anion complex such as $Au(CN)_2^-$ or $UO_2(SO_4)_3^{4-}$
Selectivity is not high. Other anions can compete with the metal being extracted
Stripping can be ion exchange for all types or deprotonation for primary, secondary and tertiary amines and trialkylguanidines
Tertiary amines and trialkylguanidines are more selective than primary and secondary amines
For all except quaternary amines, extraction must be at pH below the $pk_b$ of the extractant
Selectivity can be pH dependent
Primary, secondary and tertiary amines are relatively simple to produce

TABLE 3

NEUTRAL OR SOLVATING EXTRACTANTS

| EXTRACTANT CLASS | NEUTRAL OR SOLVATING EXTRACTANTS FORMULA OR STRUCTURE |
|---|---|
| Tri Octyl Phosphine Oxide (TOPO) | $R_3P = O$  R = $CH_3$ and $(CH_3)_2CHCH_2$ |
| Tri Butyl Phosphate (TBP) | $(RO)_3PO$ |
| Ketones (MIBK) | $R_2CO$ |
| Alcohols | ROH |

TABLE 3-continued

NEUTRAL OR SOLVATING EXTRACTANTS

EXTRACTION CHEMISTRY

Extraction is by adduct formation
$2(RO)_3PO_{(org)} + UO_2(NO_3)_2 \rightleftharpoons UO_2(NO_3)_2\ 2(RO)_3PO_{(org)}$
Stripping is with concentrated $HNO_3$
SPECIAL FEATURES TBP is used extensively in nuclear fuel reprocessing
Kinetically fast
Extract neutral metal complexes
Selectivity is low
Organometallic complex must be organic soluble

TABLE 4

ORGANIC ACID EXTRACTANTS

| EXTRACTANT CLASS | ORGANIC ACID EXTRACTANTS FORMULA OR STRUCTURE |
|---|---|
| Phosphinic Acids | $R_3\ P(O)OH$ |
| Sulphonic Acids | $R\ SO_2OH$ |
| Carboxlic Acids | $R_3C\text{—}COOH$, Versatic Acid |
| Phosphoric Acids | $(C_4H_9CH(C_2H_5)CH_2O)_2\ POOH$, D2EHPA |

EXTRACTION CHEMISTRY $4RH_{(org)} + Zn^{+2} \rightleftharpoons R_2Zn\ 2RH_{(org)} + 2H^+$
SPECIAL FEATURES Phosphinic acids are widely used for cobalt extraction
Versatic acids can be used for Cu and Ni extraction
D2EHPA extracts a wide range of metals
Operate on a hydrogen ion cycle but do not display hydrogen ion stoichiometry.
Often between 1 and 2 moles of extractant are required for each mole of hydrogen produced during extraction. This is because adduct formation is also involved in the extraction
Selectivity is poor and careful pH control may be required to achieve reasonable selectivity By way of example, in the recovery of copper, copper ore, typically a copper oxide ore or other copper source, is formed into a particulate mass, a so-called "heap" and a leaching solution trickled over and through the heap to dissolve copper in the ore, forming a copper containing solution. The leachant typically is a weak solution of sulfuric acid and usually is obtained as a recycle stream from a downstream process step such as a raffinate stream from an organic copper extraction step. The copper-rich weakly acidic aqueous solution typically is referred to as a pregnant leach solution (PLS) and is mixed with an organic solvent in a mixer. The organic solvent, which is substantially immiscible in the aqueous solution, extracts copper from the pregnant leach solution to form what is commonly termed a loaded organic stream. The mixture comprising the pregnant leach solution and organic extractant are then transferred to a settler tank where the organic phase and aqueous phases are allowed to separate to form an upper, copper loaded organic phase and a lower, copper depleted acidic aqueous phase called a "raffinate phase".

The lower aqueous raffinate phase is removed from the settler tank and typically is recycled and used as a leachant to leach more copper from the ore in the heap. The loaded organic phase is transferred to a second mixer and mixed with lean electrolyte which is obtained from a downstream electrowinning cell. The mixture is transferred to a second settler and the organic and aqueous phases allowed to separate. The lean electrolyte which typically is a highly acidic sulfuric acid stream extracts the copper from the loaded organic phase and forms a rich copper electrolyte aqueous phase. The rich copper electrolyte aqueous phase is fed to an electrowinning cell to form the copper product. Depleted electrolyte from the electrowinning cell termed "lean electrolyte" is recycled and the stream mixed with the loaded organic phase in the mixer and settler to extract more copper from the loaded organic phase. In the mixer/settler operations the loaded organic phase which is now largely depleted of the extracted copper typically is termed the "stripped organic phase" and this phase typically is recycled to the first mixer to contact and extract more copper from new pregnant leach solution.

In a typical prior art copper solvent extraction-electrowinning process, there are a number of process streams which are either recycled or used in subsequent steps of the process. Because of the nature of the mixer and settler operations and the physical and chemical characteristics of the process streams, these process streams typically contain entrained liquids which are detrimental to subsequent steps or recycle steps or which may be lost in the process causing a significant replacement cost and/or environmental problem. For example, when the raffinate stream is recycled and used to leach more copper ore, entrained organic solvent, typically kerosene, will be lost in the leaching operation adding a make-up expense to the process economics and also creating environmental and other process problems including safety hazards. Similarly, entrained water in the loaded organic phase decreases the efficiency of stripping copper from the loaded organic phase in the stripping step of the process and adds to the load on the mixer and stripper. This entrained water also transfers undesirable contaminates from the leach solution to the stripping solution or electrolyte.

In U.S. Pat. No. 4,874,534 an improved method of separating organic solvents from aqueous process streams is disclosed in connection with a copper solvent extraction/electrowinning process. Aqueous solutions such as a raffinate process stream having droplets of an organic solvent entrained therein are fed into the upper part of a vertically extending vessel having air bubbles rising therein from an air inlet near the bottom of the vessel. The entrained organic solvent in the raffinate is collected and removed from the top of the vessel and recycled in the process.

U.S. Pat. Nos. 4,269,676, 4,272,492 and 5,176,802 show typical solvent extraction processes for recovering copper from copper sulfide ores, waste products from the pyrometallurgical processing of copper ores and copper containing acidic chloride solutions.

See also U.S. Pat. No. 5,849,172 in which is disclosed a method of removing entrained liquids from liquid process streams obtained in a copper solvent extraction electrowinning process wherein a copper containing pregnant leach solution is mixed with an immiscible organic extractant to extract the copper from the pregnant leach solution to form an aqueous raffinate process stream and a copper loaded organic process stream. The loaded organic stream then is mixed with an aqueous acidic stream, to extract copper from the loaded organic stream to produce a stripped organic extractant process stream and a copper rich aqueous electrolyte process stream which aqueous electrolyte process stream is fed into an electrowinning cell and copper produced by electrowinning, the method comprising feeding one or more of the liquid process streams to one or more cyclones to remove entrained water or entrained organic extractant from the stream before the stream is used further in the process.

The above prior art processes and other prior art processes are somewhat inefficient, due to inefficient mass transfer, necessitating large volumes of organic extractant/solvent during the extraction process, and use of open tanks with long residence time resulting in large amounts of organic extractant/solvent being lost to the atmosphere. The loss of organic extractant/solvent is both costly, and creates environmental and safety hazards.

SUMMARY OF THE INVENTION

The present invention overcomes the aforesaid and other problems of the prior art, by providing, in one aspect, is a unique micro dispersion device, which significantly improves mass transfer and thus stage efficiency. The micro dispersion device of the present invention can create different dispersed phase droplet sizes and thus an optimum droplet size can be determined for a specific application. Optimum droplet sizes are determined to maximize mass transfer as well as maximizing phase separation efficiency. A disadvantage of prior art liquid-liquid ion exchange systems for dispersing one liquid in another is that air bubbles are entrained during the dispersing step. The entrained air interferes with material transfer and with coalescensce of the dispersed liquid, and delays separation of the two liquids. Our micro dispersion device avoids the formation of air bubbles as one liquid is dispersed in the other, thus providing a more efficient recovery of the desired material. Our micro dispersion device also allows the dispersion of a specific phase independent of phase volume or flow ratio. Thus, in a system where the organic to aqueous (O/A) ratio is for example, 4:1, the organic phase can be dispersed using our micro dispersion device without having to recycle the aqueous phase. Our micro dispersion device produces a more uniform distribution of droplet sizes within the continuous phase compared to heretofore existing phase mixing devices available.

The micro dispenser device controls which solution phase is dispersed and which solution phase is continuous. Conventional prior art mixers do not control the dispersed or continuous phase but rather the solution flow to the mixer controls this parameter. It follows that regardless of which solution has the overall larger volume, the micro dispenser device of the present invention does not require the larger solution volume (or a recycle on the lower solution volume) to ensure a continuous phase for the mixer. This provides the operator with more operational flexibility and avoids the costs of recycling a lower volume solution which needs to be the continuous phase.

A further advantage associated with the control of the dispersed phase through the use of the micro dispenser device is that entrainment can be reduced. Entrainments, as general principle, in the dispersed phase is much less than entrainment in the continuous phase.

Additionally, the micro dispenser device of the present invention ensures the optimum droplet size is created for the dispersed phase which leads to improved mass transfer and improved stage efficiency.

The micro dispenser device of the present invention also ensures a uniform droplet size which will improve phase separation.

The micro dispenser device of the present invention is a closed system, which does not introduce air into the system. This reduces the formation of a third (air) phase into the settler or centrifuge and thus improves phase separation. Additionally, the reduction or elimination of air in the system will reduce the degradation of organic as well as lessening organic/solvent losses.

In another aspect we provide a unique centrifuge separator, which allows high phase separation efficiency due to the high 'g' force created in a rotating bowl. The centrifuge separator of the present invention has a lower cost compared to other centrifugal extractors and separators. The economical design and manufacturing techniques allows the use of a centrifugal separator in, for example, hydrometallurgical solvent extractors operations. Currently available centrifugal contactors and separators are too costly and are uneconomical to use in most solvent extractors operations. Our centrifuge separator offers the advantages over other currently available process equipment such as low hold-up, low residence time, and low organic/solvent inventory. The rotating bowl of our centrifuge separator imparts the liquid in a practically rigid body rotation. The inner surface of the rotating liquid has almost a vertical shape because of the high 'g' force. The dispersion entering at the bottom gets separated as it moves upward. The rate of separation depends upon the drop size distribution, their settling velocities under the centrifugal action ($r\Omega^2$)—where r is the radius of the centrifuge bowl and $\Omega$ is the rotational speed, plus densities, viscosities and coalescing behavior of the two phases. For complete separation, adequate height needs to be provided for a given level of centrifugal action—($r\Omega^2$). The outlet ports at the top are positioned in such a way that only very clean light and heavy phases exit the unit after separation.

The design of our centrifuge separator is unique. These design techniques eliminate or significantly reduce the shortcomings found in existing centrifugal based systems. Our centrifuge separator (with or without our micro dispenser device) is designed so the entering flow does not contain, or contains very little, entrained air. Feed pipes and the separation chamber are occupied essentially 100% by liquid. This avoids air entrainment, which increases phase separation times. This also eliminates a third phase in the centrifuge chamber—thus increasing the volume occupied by the liquids and hence increasing residence times compared to existing centrifuge designs of the same size.

Moreover, our centrifuge separator, which is significantly less expensive to make. This makes the use of a centrifuge separator much more economically viable.

Furthermore, the rotational speed of our centrifugal separator is independent of the mixing step. In conventional centrifugal based extraction systems, the mixer is operated at the same speed as the separating bowl. Thus the mixing operation is dependent on the separation RPM and vice versa. Mixing and separation are two discrete operations and should be independent. Our centrifugal separator, is totally separate from the mixing operation.

Finally, unlike conventional settlers, in our system separation of the phases occurs within a closed system. A closed system greatly reduces, if not eliminates VOC emissions as well as organic/solvent losses due to evaporation.

Working together, our micro dispersion device and our centrifuge separator significantly improve mass transfer and stage efficiency, while at the same time, improve separation and reduce entrainment losses all at a lower cost than conventional solvent extraction systems and existing centrifuge systems. Moreover, our solvent extraction system is an essentially closed solvent extraction system, which minimizes organic solvent loss from evaporation. By way of example, as applied to production of copper by solvent extraction, in accordance with present invention, we provide a solvent extraction process in which an aqueous based leach solution is mixed with an immiscible organic solvent that is passed through a permeable or porous body, forming micro dispersed droplets of the organic solution in a continuous aqueous phase solution. The resulting dispersion is then passed through a centrifugal separator.

More particularly, in one aspect the present invention provides a micro dispersion apparatus for mixing of two liquids of different densities which liquids are substantially insoluble in one another, said apparatus comprising a hollow permeable body having a recess for receiving a first fluid which can flow from the recess through the permeable body to an exterior of the permeable body; a housing surrounding and spaced from the exterior of the permeable body, said housing having an inlet for a second fluid and an outlet for a mixture of the first and second fluid; and a baffle or baffles in the space between the exterior of the permeable body and the housing, the baffle or baffles being spaced to define a mixing channel in the space between the exterior of the permeable body and the housing so that the second fluid can enter the housing inlet and flow through the mixing channel to the outlet, while picking up fluid on the exterior of the permeable body.

In one embodiment, wherein the mixing channel is substantially in the shape of a helix, or the baffle is formed of a series of elongated segments formed end-to-end.

In one embodiment, the permeable body has pores in the range of 0.2 to 400 microns, preferably 20 to 200 microns, more preferably 60 to 100 microns.

The micro dispersion device is similar to the device described in our prior U.S. Published Application US 2003/0029795 A1. However, unlike the micro dispersion device described in our prior U.S. Published Application US 2003/0029795 A1, the permeable body is filed, at least in part, with loosely packed finely divided media or fits.

The present invention also provides an apparatus for separating and recovery of a metal such as copper from a metal-containing source such as a copper-containing source by a solvent extraction/electrowinning process, comprising a mixing device for mixing a metal-containing aqueous solution and an immiscible organic extractant, wherein the mixing device comprises apparatus as above described, the apparatus further comprising a centrifugal separator, and a mixing conduit connecting the mixing device with a centrifugal separator.

In one embodiment, the mixing conduit is sized and shaped to provide a travel or residence time between the mixing device and the centrifugal separator of 5-120 seconds, preferably 20-60 seconds, more preferably 35-45 seconds.

In one embodiment, the centrifugal separator separates the mixture into two streams, a heavy phase and a light phase, the heavy phase comprising primarily an aqueous phase containing copper, said apparatus further comprising a conduit carrying the heavy phase to an electrowinning stage.

In another embodiment, the apparatus further comprises a conduit carrying the light phase conduit to the mixing device.

The invention also provides a method for separating a mixture of a first and a second fluid of different densities, which fluids are substantially insoluble in one another, said method comprising providing an apparatus as above described, flowing the first fluid from an interior of the permeable body to an exterior of the permeable body; and contacting the first fluid on the exterior of the permeable body with the second fluid.

In one embodiment, the permeable body has pores in the range of 0.2 to 400 microns, preferably 20 to 200 microns, more preferably 60 to 100 microns.

In another embodiment of the method the permeable body is filled, at least in part, with loosely packed finely divided media or fits, and including the step of flowing the first fluid through the media or fit.

In one aspect of the invention, as applied specifically to processing of copper sulfate, the aqueous based solution compromises an aqueous acid solution, while the organic solution comprises an organic solvent, such as kerosene.

The present invention also provides a method for separating and recovery of metals such as copper from a metal-containing source by a solvent extraction electrowinning process, comprising providing a copper-containing aqueous solution and an immiscible organic extractant to a mixing device, wherein the mixing device comprises an apparatus as above described; whereupon the organic extractant is dispersed in the copper-containing aqueous solution and extracts metal from the aqueous solution, passing the resulting dispersion through a mixing conduit to a centrifugal separator, and separating the organic extractant containing metal from the aqueous solution.

In one embodiment, the mixing conduit is sized and shaped to provide a travel or residence time between the mixing device and the centrifugal separator of 5-120 seconds, preferably 20-60 seconds, more preferably 35-45 seconds.

In another embodiment of the method, the centrifugal separator separates the mixture into two streams, a heavy phase and a light phase, the heavy phase comprising primarily an aqueous phase containing copper; including the steps of passing the heavy phase to an electrowinning stage.

Yet another embodiment of the method includes the step of returning the light phase, at least in part, to the mixing device.

BRIEF DESCRIPTION OF THE DRAWINGS

Further features and advantages of the present invention will be seen from the following detailed description, taken in conjunction with the accompanying drawings, wherein like numerals depict like parts, and wherein.

DETAILED DESCRIPTION OF THE INVENTION

Figure 1:
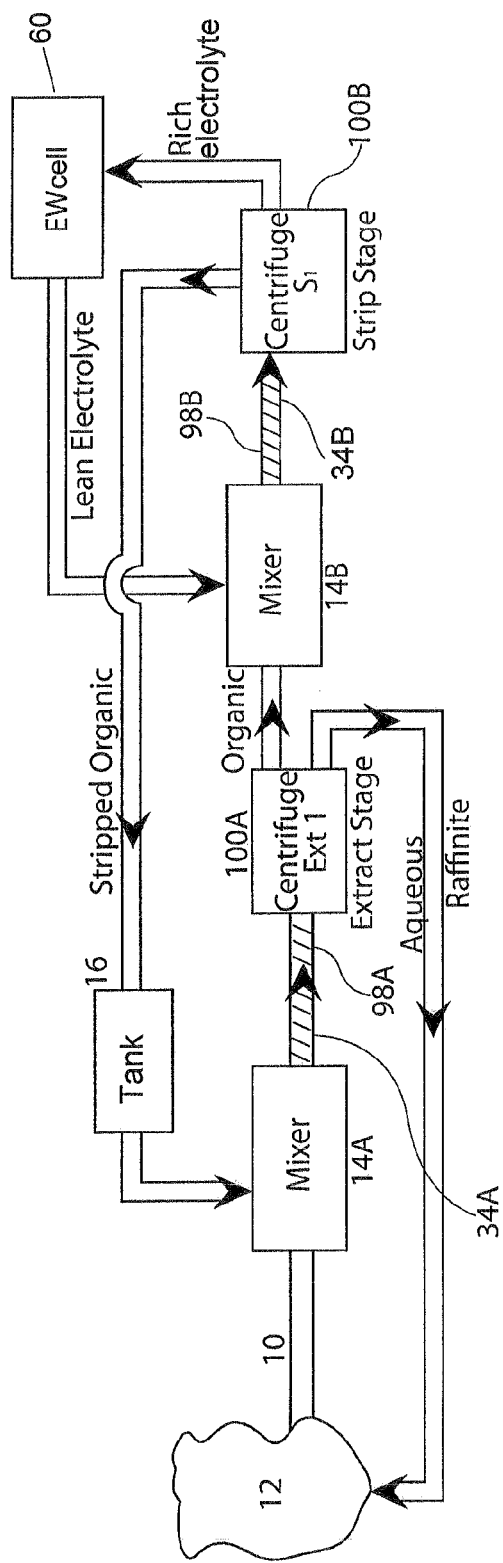
FIG. 1 is flow diagram of a system for the hydrometallurgical production of a metal such as copper in accordance with one aspect the present invention.
Figure 1A:
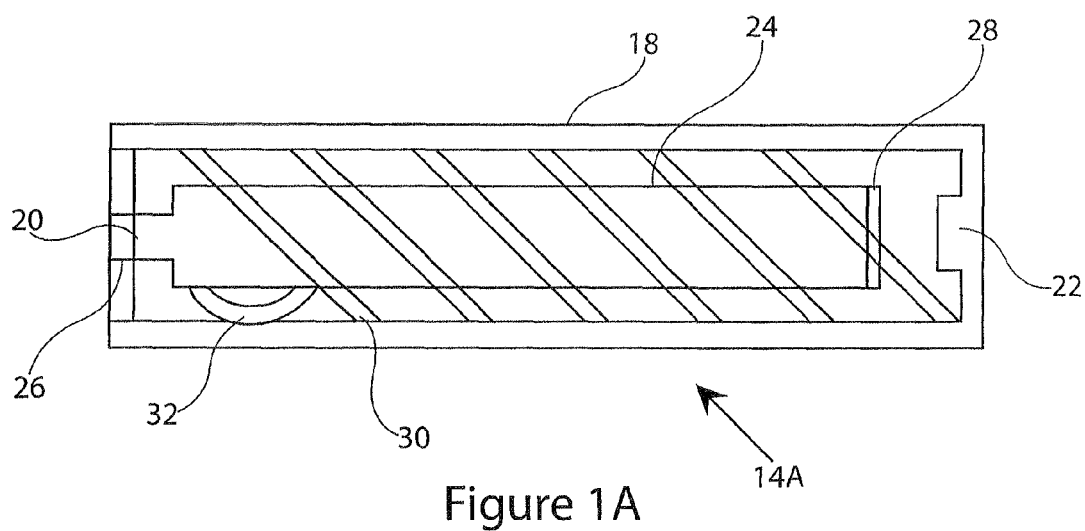
FIG. 1A is a side elevational view, in cross section, showing details of an apparatus for dispersing an organic fluid such as kerosene into an aqueous-based solution in accordance with another aspect of the present invention.

The invention will now be described in connection with the production of copper from a copper-containing ore. Referring first to FIGS. 1 and 1A, a copper containing pregnant leach solution (PLS) 10 from a copper oxide ore heap 12, is fed to a first mixing vessel 14A where the pregnant leach solution is mixed with an organic liquid extractant such as a hydroxyl oxime ion exchanger in kerosene supplied from tank 16. Referring in particular to FIG. 1A, mixing vessel 14A comprises an elongate cylindrical housing 18 having an inlet 20 at one end, and an outlet 22 at the other end. A permeable body 24 in the shape of a cylindrical tube is coaxially disposed within the cylindrical housing 18. However, housing 18 and permeable body 24 need not be cylindrical—they may be square, or rectangular or have other geometric shapes in cross-section. The permeable body 24 is connected to the housing inlet 20 at one end 26, and a disc 28 closes the end of permeable body 24 adjacent the housing outlet 22.

The outer wall of permeable body 24 is spaced from the interior wall of housing 18. A helical baffle 30 is located within the annular space between the outer wall of permeable body 24 and the inner wall of housing 18. Baffle 30 may be a continuous elongated helical strip or formed as a series of segments. Mixing vessel 14A also has a lateral inlet 32 adjacent the inlet 20 end.

Permeable body 24 can be made of permeable or porous metal, and is filled with loosely packed finely divided media or frits such as powdered metal particles or ceramic particles. Various permeable and porous metals are available commercially from a variety of vendors including Mott Metallurgical Corporation of Farmington, Connecticut. The permeable or porous metal used in this invention preferably has substantially uniform pore sizes, or at least most of the pores are within an acceptable range for the intended purpose, and typically are in. the range of 0.2 to 400 microns, preferably 20 to 200 microns, more particularly 60to 100microns. The porous media or frits should be inert to the liquids being handled. For example, the media or hits can he made of particles of ceramic, or stainless steel, Nickel 200, MONEL® nickel-comer alloy 400, ICONEL® nickel-chromium alloy 600, HASTELLOY® nickel-molybdenum-chromium alloy C276, Alloy 20, gold, platinum, silver, and titanium. As will be described below, the media or fits, by their nature, cause the droplets of the organic solvent to finally divide, dispersing fine droplets on the outer surface of the permeable body 24, where they are picked up by the PLS.

In use, the organic liquid extractant in kerosene is introduced through inlet 20 into the interior of permeable body 24. PLS is introduced into the interior of mixing vessel 14A through lateral inlet 32, into the space between the outer wall of permeable body 24 and the inner wall of mixing vessel 14A. The organic liquid extractant is forced through the permeable body 24 and emerges from the permeable body in the form of a fine organic liquid extractant droplets where the droplets are picked up by the flowing PLS, forming a dispersion of kerosene droplets in the PLS. The PLS preferably is flowed under turbulent conditions so that the droplets of the organic liquid extractant are quickly dispersed before having an opportunity to coalesce. The organic liquid extractant, which is substantially immiscible with the aqueous based PLS solution, extracts copper from the pregnant leach solution, and emerges from the mixing vessel 14A via outlet 22.

Alternatively, the PLS may be introduced into the interior of permeable body 24, and the organic liquid extractant introduced into the interior of the mixing vessel 14A through lateral inlet 32, into the space between the outer wall of permeable body 24 and the inner wall of mixing vessel 14A. In such case, the PLS is forced through the permeable body 24, and emerges from the permeable body in the form of fine droplets which are picked up by the flowing organic liquid extractant, forming a dispersion of aqueous droplets in the kerosene.

The solution emerging from outlet 22 is passed via conduit 34A to an extract stage centrifugal separator 100A as will be described in detail below. Conduit 34A includes inline baffles shown in phantom as 98A for maintaining the fluid in a mixed condition. Conduit 34A is sized and shaped relative to the flow of fluid from mixing vessel 14A to provide a travel or residence time sufficient to permit substantial mass transfer of copper in the aqueous solution to the organic liquid extractant. Ordinarily, a residence time of 5-120 seconds, preferably 20-60 seconds, more preferably 35-45 seconds, is sufficient before the fluid is introduced into a centrifugal separator 100A. Alternatively, one or more loops may be included in the conduit 34A, or the cross sectional size of the conduit 34A increased so that the flow from mixing vessel 14A is controlled to within the target residence time of 5-120 seconds.

As will be described below, centrifuge separator 100A creates two exit streams-a light phase (organic) and a heavy phase (aqueous raffinate). The aqueous raffinate is recycled to the leach heap to dissolve more copper. The organic phase exiting the centrifuge 100A is transferred to another mixing vessel 14B, similar to mixing vessel 14A, where it is mixed with lean electrolyte from the electrowinning stage 60 as will be discussed below. As before, the organic liquid extractant is forced through the permeable body 24 contained in mixing vessel 14B, and emerges from the permeable body in the form of a fine organic liquid extractant droplets where the droplets are picked up by the flowing electrolyte, forming a dispersion of kerosene droplets in the electrolyte. As before, the electrolyte preferably is flowed under turbulent conditions so that the droplets of the organic liquid extractant are quickly dispersed before having an opportunity to coalesce. The electrolyte or stripping solution, which is substantially immiscible with the organic liquid extractant removes (strips) copper from the organic liquid extractant and emerges from the mixing vessel 14B, where it is passed via conduit 34B which also contains inline baffles shown in phantom as 98B, similar to conduit 34A, for maintaining the fluid in a mixed condition. As before, conduit 34B is sized and shaped relative to the flow of the fluid from mixing vessel 14A to provide a travel or residence time sufficient to permit substantial mass transfer of copper in the aqueous solution to the organic liquid extractant. The fluid then passed to a second strip stage centrifuge 100B which is similar in construction to centrifuge 100A as will be described in detail below, and in which a light organic phase is partially stripped of copper and returned to tank 16, and a rich copper electrolyte phase is passed to an electrowinning cell 60.

Figures 2, 2A:
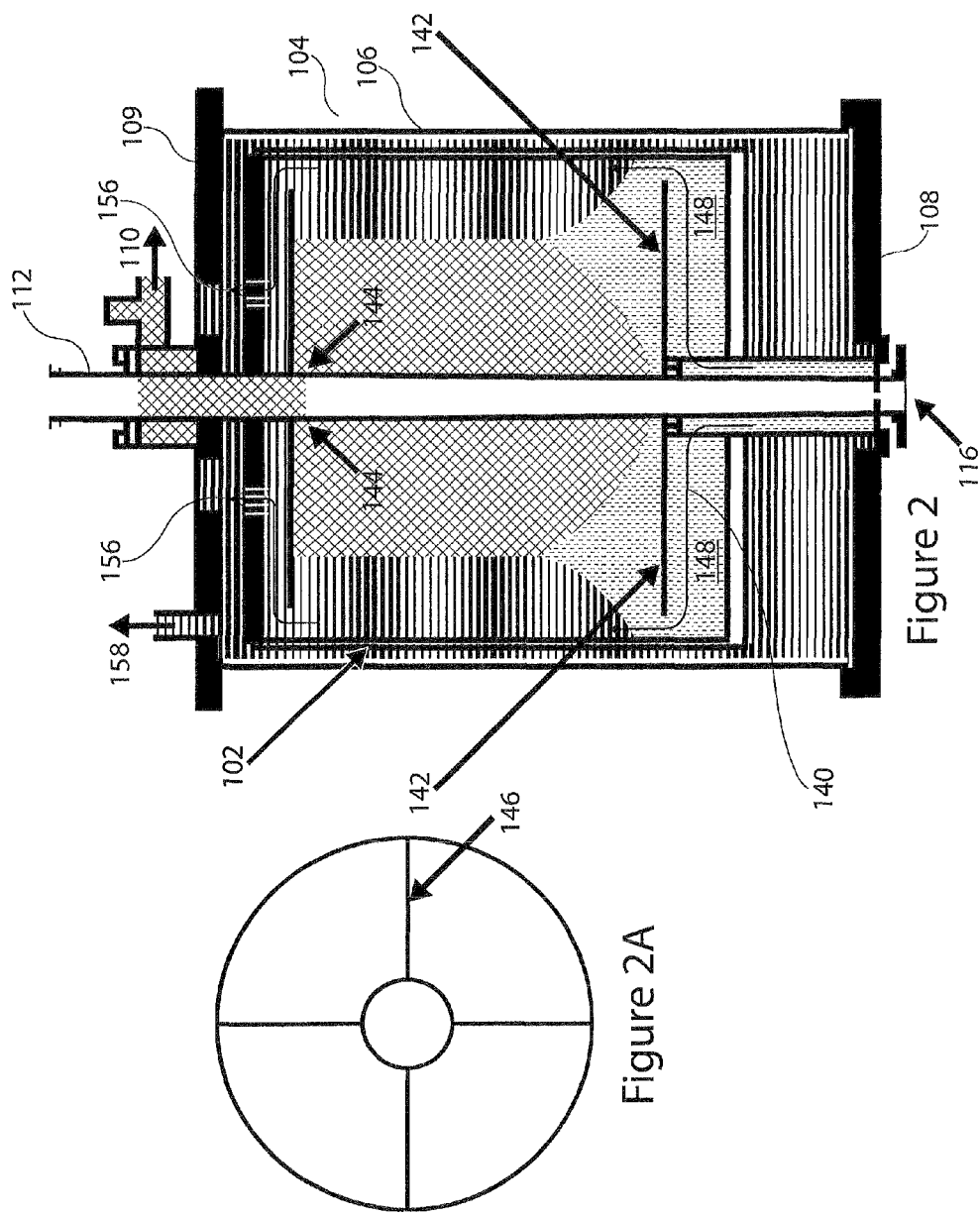
FIG. 2 is a side elevational view, in cross section, of a centrifugal contactor-separator employed in accordance with the present invention.
FIG. 2A is a cross-sectional view of the rotating cylinder portion of the centrifugal contractor-separator of FIG. 2.

Referring in particular to FIG. 2, there is shown centrifugal separator 100A. However, centrifugal separator 100B is essentially the same. Centrifugal separator 100A, which is similar to the centrifugal separator described in our prior U.S. Pat. No. 6,440,054, comprises a rotatable cylinder 102 in the shape of a vertical right cylinder contained in a housing 104 having vertical side wall 106 bottom wall 108 and top wall 109. A vertical drive shaft 112 is suspended at the upper end of housing 104 by an upper thrust bearing. Centrifugal separator 100A has an inlet 116 for input of an organic/aqueous mixed phase, i.e., from conduit 34A. The solution enters the central opening (orifice) 140 of the rotating cylinder 102. The dispersion entering central orifice 140, gets deflected towards the outside wall of the cylinder by a horizontal deflecting baffle 142 provided close to the entrance. Referring also to FIG. 2A, unlike the centrifugal separator described in our aforesaid U.S. Pat. No. 6,440,054, the mixing box at the bottom of the centrifugal separator is eliminated, and the upper end of rotating cylinder 102 provided with a plurality of vertical baffles 146 which create several chambers ranging from 4 to 8. In a preferred embodiment, we create four (4) chambers. The rotating cylinder 102 imparts to the liquid a practically rigid body rotation. The inner surface of the rotating liquid has almost a vertical shape because of high 'g' except a small parabolic portion adjacent the bottom. The dispersion entering at the bottom region 148 gets separated as it moves upwards. The rate of separation depends upon the droplet size distribution, their settling velocities under the centrifugal action (r$\Omega$2), where r is the radius of the bowl/chamber and $\Omega$ is the rotation speed), densities, viscosities and coalescing behavior of the two phases. For complete separation, adequate height needs to be provided for a given level of (r$\Omega$2). Inside the bowl/chamber the solution is separated into two phases—a light phase which is discharged through the ports 144 and exits the unit through the top port 110, and a heavy phase which is discharged through outlet ports 156 and leaves the unit through outlet 158. The heavy phase outlet ports 156 have variable positions which are selected and changed according to the relative flow rates of the heavy and light phases and the relative volumes of each phase within the centrifugal separator 100A.

Figure 3:
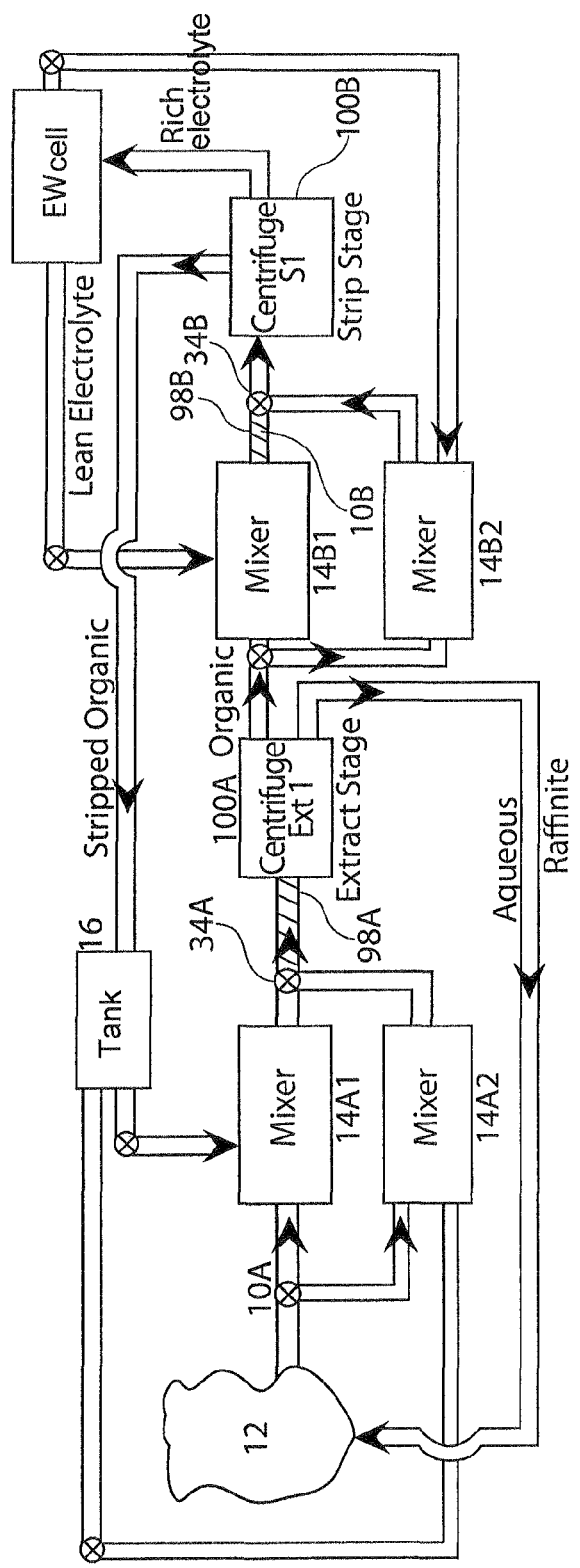
FIG. 3 is a flow diagram, similar to FIG. 1 of an alternative system for the hydrometallurgical production of a metal such as copper in accordance with the present invention.

FIG. 3 shows an alternative embodiment of the invention. The FIG. 3 embodiment includes two mixing vessels 14A1 and 14A2, and 14B1 and 14B2 for both the extract stage as well as the strip stage connected through valving and conduits 10A, 10B, 34A, 34B, so that one mixing vessel may remain in service, while the other mixing vessel is taken off line for maintenance or cleaning.

The present invention provides various advantages over prior art processes. For one, the system is closed. Thus, loss of organic solvent, i.e. due to evaporation is avoided. Also, by passing the organic phase through finely divided media or frits, and a permeable body before the organic phase is mixed with the PLS, a micro dispersion of the organic phase is formed in the PLS. Thus, less organic solvent is needed in the overall process. Also, higher throughput may be achieved with smaller equipment overall, thus adding to equipment savings, as well as operational savings.

Also, from studies and tests we found that entrainment of the organic phase in the aqueous is generated in the mixing step and not influenced by the separator. The quantity of entrainment is substantially effected by air ingestion. Using the hollow permeable body mixing apparatus as above described greatly reduces the possibility of air entrainment in the liquid and thus improves separation in the downstream separator (any separator for that matter).

Also, if air is excluded from the dispersion in the mixer, then organic-in-aqueous entrainment is minimized and aqueous-in-organic entrainment essentially reduced essentially to undetectable levels. Thus, our mixing apparatus as above described allows for a reduction, if not essentially elimination of air entrainment in the liquid thus reducing entrainment of one phase in the other phase. Conventional prior art mixing devices cannot achieve this since by design conventional mixing systems are exposed to the atmosphere and draw air into the liquid.

Various changes may be made in the above invention without the departing from the spirit and scope thereof. While the recovery of copper by electrowinning (post solvent extraction) has been described in the above working example, recovery of other metals, or other post-solvent extraction steps are possible. By way of example, Uranium may be recovered as 'yellow cake' (approximately 80% U3O8) by precipitation and calcining of ammonium uranyl sulfate. Also, some recovery systems employ crystallization to create a nickel sulfate or copper sulfate crystal. And, while electrowinning creates 99.99+ pure copper at the cathode, other metals, for example, zinc, are also electrowon. And some operations also use spray drying technology to create a metal salt dust. Still other changes including recovery of other metals including, but not limited to zinc, nickel, cobalt and uranium, using appropriate extractants, e.g. as above described, are possible.

The invention claimed is:

1. An apparatus for separating two liquids of different densities wherein one of the liquids comprises an organic solvent, which liquids are substantially insoluble in one another, said apparatus comprising;

a tank holding a supply of said organic solvent;

a first mixing vessel in the form of an elongate cylindrical housing having a first fluid inlet for introduction of a first fluid including organic solvent from said supply, adjacent a first end, and a fluid outlet adjacent a second end, said first mixing vessel including a first permeable body in the form of a cylindrical tube coaxially disposed within and spaced from an interior wall of said cylindrical housing, said permeable body having a second fluid inlet for a second fluid adjacent said first end and being closed adjacent said second end, said first permeable body being at least partially filled with loosely packed finely divided media or fits, and having a baffle or baffles in the space between the exterior of the first permeable body and an interior wall of the housing, the baffle or baffles being spaced to define a mixing channel through the space between the exterior of the first permeable body and the interior wall of the housing so that the first fluid enters the first fluid inlet and flows through the mixing channel to the outlet, while picking up the second fluid permeating through the first permeable body to the exterior of the first permeable body; and a second mixing vessel, similar to the first mixing vessel, said second mixing vessel also being in the form of an elongate cylindrical housing also having a first fluid inlet for introduction of a first fluid including organic solvent from said supply, adjacent a first end and a fluid outlet adjacent a second end, said second mixing vessel including a second permeable body in the form of a cylindrical tube coaxially disposed within and spaced from an interior wall of said cylindrical housing, said second permeable body having a fluid inlet for a second fluid adjacent said first end and being closed adjacent said second end, said second permeable body being at least partially filled with loosely packed finely divided media or frits, and having a baffle or baffles in the space between the exterior of the second permeable body and an interior wall of the housing, the baffle or baffles being spaced to define a mixing channel through the space between the exterior of the second permeable body and the interior wall of the housing so that the first fluid enters the first fluid inlet and flows through the mixing channel to the outlet, while picking up the second fluid permeating through the second permeable body to the exterior of the second permeable body; wherein:

first and second fluid inlet conduits are connected respectively, via valving, to said first fluid inlets of said first and second mixing vessels, and first and second outlet conduits are connected respectively, via valving, to said first and second mixing vessels outlets, creating a closed system, so that one mixing vessel remains in service, while the other mixing vessel is taken off line for maintenance or cleaning;

said apparatus further comprising a centrifugal separator connected to the first or second mixing vessels via the first and second outlet conduits, wherein said first and second outlet conduits have a baffle or baffles on an inner wall thereof, so that fluid flows therethrough under turbulent flow conditions, and wherein the centrifugal separator includes a chamber containing rotating cylinders having a plurality of vertical baffles at an upper end thereof, said chamber further includes a plurality of outlet ports at the upper end thereof.

2. The apparatus of claim 1, wherein the mixing channels of the first and second mixing vessels are substantially in the shape of a helix.

3. The apparatus according to claim 1, in which the baffles of the first and second mixing vessels are formed of a series of elongated segments formed end-to-end.

4. The apparatus according to claim 1, wherein the permeable bodies of the first and second mixing vessels have pores in the range selected from the group consisting of 0.2 to 400 microns, 20 to 200 microns, and 60 to 100 microns.

5. The apparatus according to claim 1, wherein the centrifugal separator is adapted to separate the mixture into two streams, a heavy phase and a light phase, the heavy phase comprising primarily an aqueous phase containing metal; said apparatus further comprising a conduit carrying the heavy phase to an electrowinning stage.

6. The apparatus according to claim 5, further comprising a conduit selectively carrying the light phase to the first or second mixing device.

7. The apparatus according to claim 1, wherein the metal comprises copper.

8. A method for separating the mixture of the first and the second fluid of different densities, which fluids are substantially insoluble in one another, said method comprising providing an apparatus as claimed in claim 1, flowing the first fluid from an interior of the permeable bodies of the first or second mixture vessels to an exterior of the permeable body, and contacting the fluid on the exterior of the permeable body with the second fluid.

9. The method according to claim 8, wherein the permeable body has pores in the range selected from the group consisting of 0.2 to 400 microns, 20 to 200 microns, and 60 to 100 microns.

10. The method according to claim 8, including the step of flowing the first fluid through the media or frit of the first and second mixing vessels.

11. A method for separating and recovery of metal from a metal-containing source by a solvent extraction/electrowinning process, comprising providing a metal-containing aqueous solution and an immiscible organic extractant to a mixing device, wherein the mixing device comprises an apparatus as claimed in claim 1, whereupon the organic extractant is dispersed in the copper-containing aqueous solution and extracts metal from the aqueous solution, passing the resulting dispersion through the first and second outlet conduits to the centrifugal separator, and separating the organic extractant containing copper from the aqueous solution.

12. The method according to claim 11, including steps of controlling a travel time between the first and second mixing vessels and the centrifugal separator to a time selected from the group consisting of 5-120 seconds, 20-60 seconds, and 35-45 seconds.

13. The method according to claim 11, wherein the centrifugal separator separates the mixture into two streams, a heavy phase and a light phase, the heavy phase comprising primarily an aqueous phase containing metal, and including the step of passing the heavy phase to an electrowinning stage.

14. The method as claimed in claim 11, including the step of returning the light phase at least in part, to the first or second mixing vessels.

15. The method as claimed in claim 11, wherein the metal comprises copper.

16. The apparatus of claim 1, wherein the first fluid inlet of the first mixing vessel or the second mixing vessel, is laterally disposed adjacent the second fluid inlet of said permeable body of the first or second mixing vessel.

17. The apparatus of claim 1, wherein the baffle of the first or second mixing vessel has the form of a continuous elongated helical strip.

18. The apparatus of claim 1, wherein the plurality of outlet ports at the upper end of the centrifugal separator have variable positions.

* * * * *